N. AND M. SLOANE.
MIRROR AND LIGHTING MEANS THEREFOR.
APPLICATION FILED NOV. 29, 1921.
1,426,228.                                     Patented Aug. 15, 1922.
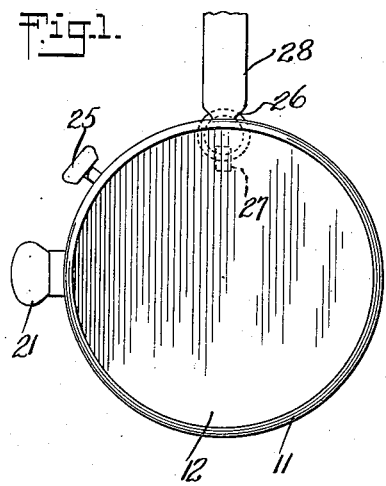
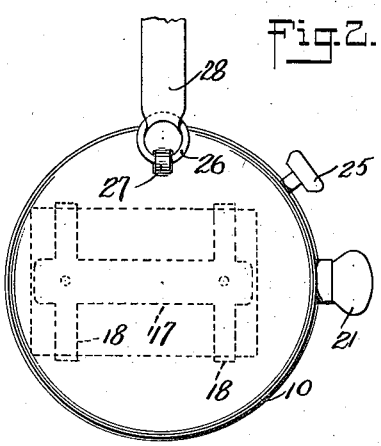
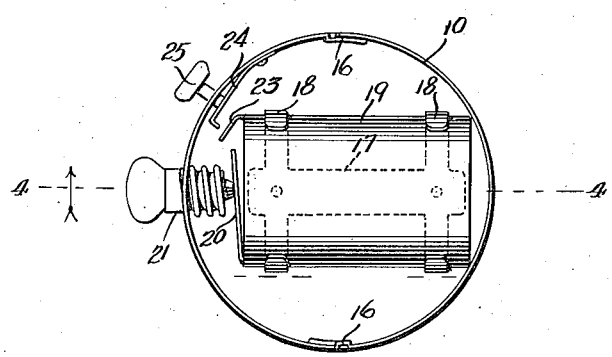
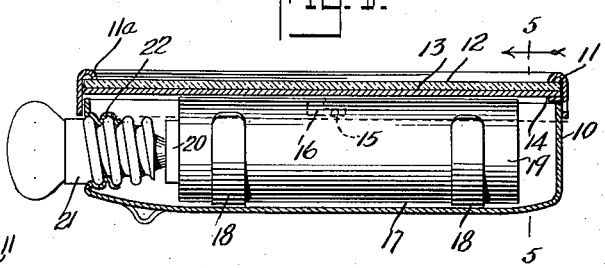
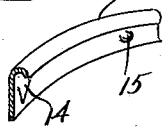
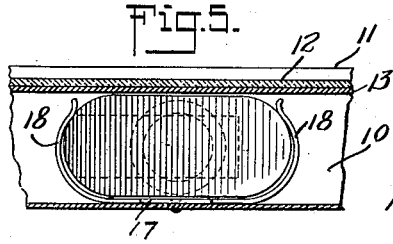
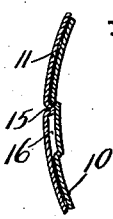
WITNESSES
INVENTORS
MAX SLOANE
NATHAN SLOANE
BY
ATTORNEYS

UNITED STATES PATENT OFFICE.

NATHAN SLOANE AND MAX SLOANE, OF BROOKLYN, NEW YORK.

MIRROR AND LIGHTING MEANS THEREFOR.

1,426,228.  Specification of Letters Patent.  Patented Aug. 15, 1922.

Application filed November 29, 1921. Serial No. 518,729.

*To all whom it may concern:*

Be it known that we, NATHAN SLOANE and MAX SLOANE, citizens of Russia, and residents of the city of New York, borough of Brooklyn, in the county of Kings and State of New York, have invented a new and Improved Mirror and Lighting Means Therefor, of which the following is a description.

Our invention is intended more particularly for use in association with a small hand mirror of the type carried in vanity bags and has for its general object to provide a new assemblage involving few and simple parts whereby to provide for the electrical illumination of the mirror.

A further object of the invention is to provide a construction promoting convenience in assemblage and in the renewal of the battery.

The nature of the invention and its distinctive features and characteristics will clearly appear as the description proceeds.

Reference is to be had to the accompanying drawings forming a part of this specification, it being understood that the drawings are merely illustrative of one example of the invention.

Figure 1 is a front view of a mirror and lighting means embodying our invention;

Figure 2 is a back view thereof;

Figure 3 is a front view with the mirror and its clamping ring removed;

Figure 4 is a vertical section in a plane indicated by the line 4—4, Figure 3, but showing the mirror and its clamping ring in position;

Figure 5 is a detail in vertical section in a plane indicated by the line 5—5, Figure 4;

Figure 6 is a fragmentary perspective view showing a portion of the clamp ring;

Figure 7 is a fragmentary horizontal section through the body and ring, the view being given to show the means for holding the clamp ring in position.

In carrying out our invention in accordance with the illustrated example a box-like shell or body 10 is provided, and a separate clamp ring 11 fitting the front thereof. A mirror 12 and a back 13 of suitable material for said mirror are held to said clamp ring by beading over the upper edge 11 of said clamp ring and by bending tongues 14 laterally inward from material of said ring, behind the back 13. The clamp ring 11 extends below the tongues 14 and the arrangement is such that said clamp ring fits outside of the edge of the shell 10 while said edge abuts against the tongues 14.

We provide coacting means on the ring 11 and on the body 10 for holding the ring in position, there being shown for the purpose in the illustrated example protuberances 15 at the interior of the ring 10 and bayonet slots 16 stamped inward in the material of the shell 10 and adapted to receive said protuberances 15.

Rigid with the body 10 at the interior is a clamp bar 17 having curved resilient clamps 18 adjacent to the ends thereof between which a battery 19 may be snapped. Said battery has one pole 20 in the form of a resilient contact element adapted to receive the contact of the plug of the lamp 21 which screws into a threaded internal boss 22 stamped up from the material of the body 10 at a side of the latter. The second pole 23 of the battery is in the form of a contact element at a side of the battery adapted to be engaged by a flexible contact 24 on the body 10 at the interior. Associated with the contact 24 is a pushbutton 25, the head of which lies at the exterior of the body 10, at a side of said body, the arrangement being such that an inward movement of the pushbutton 25 will close the lighting circuit, at the contacts 23, 24, so that the face of a person looking into the mirror at close range will be illuminated.

The body may have a ring 26 suitably secured to the bottom thereof by a loop 27 and attached to said ring is a fabric strip or tape 28 for convenience in handling the mirror and also useful for pinning the mirror, when desired, to a vanity bag at the interior.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. In a mirror and lighting means therefor, a shell constituting a battery casing, a pair of clamps secured to the shell for holding a battery therein, a lamp on the shell and projecting to the exterior of the latter, means on the shell to make and break the lamp in the battery circuit, a clamp ring on the shell at the front and detachably engaging by its rear edge the shell at the open front of the latter, a mirror within said ring, and means on the ring permanently holding the mirror independently of the engagement of the clamp ring with said shell.

2. In a mirror and lighting means therefor, a shell constituting a battery casing, means in the shell to detachably hold the battery, said shell being open at the front, an electric lamp on the shell at a side thereof in circuit with the battery, a circuit maker and breaker operable from the exterior of the shell, a clamp ring on the shell, the rear portion of said ring fitting the shell to permit detachment of the ring, a mirror within said ring, and tongues bent laterally inward on the ring at the back of said mirror, said tongues being positioned forward of the rear edge of the ring, the front edge of the ring being beaded over the front of the mirror.

NATHAN SLOANE.
MAX SLOANE.